(12) United States Patent
Su et al.

(10) Patent No.: US 7,238,281 B2
(45) Date of Patent: Jul. 3, 2007

(54) STORM WATER RUNOFF TREATMENT SYSTEM

(75) Inventors: Yuming Su, Athens, OH (US); Gayle F. Mitchell, Athens, OH (US)

(73) Assignee: Ohio University, Athens, OH (US)

( * ) Notice: Subject to any disclaimer, the term of this patent is extended or adjusted under 35 U.S.C. 154(b) by 165 days.

(21) Appl. No.: 11/184,133

(22) Filed: Jul. 18, 2005

(65) Prior Publication Data

US 2007/0012608 A1    Jan. 18, 2007

(51) Int. Cl.
*B01D 21/02* (2006.01)
(52) U.S. Cl. ............... 210/170.03; 210/519; 210/521; 210/532.1
(58) Field of Classification Search ........... 210/170.03, 210/512.1, 519, 521, 532.1
See application file for complete search history.

(56) References Cited

U.S. PATENT DOCUMENTS

| | | | | |
|---|---|---|---|---|
| 2,226,968 A | * | 12/1940 | Clerici | 210/532.1 |
| 3,374,894 A | * | 3/1968 | Webster | 210/532.1 |
| 3,965,013 A | * | 6/1976 | Jackson | 210/519 |
| 5,147,556 A | * | 9/1992 | Taylor | 210/519 |
| 5,186,836 A | * | 2/1993 | Gauthier et al. | 210/512.1 |
| 5,498,331 A | * | 3/1996 | Monteith | 210/170.03 |
| 5,575,909 A | * | 11/1996 | Foster | 210/532.1 |
| 5,746,911 A | | 5/1998 | Pank | |
| 5,759,415 A | * | 6/1998 | Adams | 210/519 |
| 6,475,381 B1 | * | 11/2002 | Gustafsson | 210/521 |
| 6,783,683 B2 | | 8/2004 | Collings | |
| 6,951,619 B2 | * | 10/2005 | Bryant | 210/519 |
| 2004/0055950 A1 | * | 3/2004 | Bryant | 210/521 |
| 2005/0056587 A1 | * | 3/2005 | Allen et al. | 210/519 |
| 2005/0077248 A1 | * | 4/2005 | Stark et al. | 210/519 |

OTHER PUBLICATIONS

A Big Player for L.A. Water © Scranton Gillette Communications Inc. Mar. 2003, 3 pgs.
Allen, et al., Stormwater Management: Measuring of Treatment Systems, SiteSolutions Magazine, 3 pgs.
Allen, et al., Vortechnics Inc. A comprehensive approach to performance verification for stormwater treatment systems, 6 pgs.
Aquashield Stormwater Treatment Solutions Aquaswirl Operation http://aquashield.com/asoperation.html, Mar. 7, 2005, ©AquaShield, Inc. 2 pgs.
Capture It and Keep It, Downstream Defender, Hydro International, 1 pg.
CDS Stops Water Pollution, CDS Technologies, 1 pg.

(Continued)

*Primary Examiner*—Christopher Upton
(74) *Attorney, Agent, or Firm*—Calfee Halter & Griswold, LLP

(57) ABSTRACT

A hydrodynamic device for removing sediment and other materials from storm water runoff is provided. An exemplary embodiment of this device includes: a first substantially cylindrical chamber a second substantially cylindrical chamber concentrically disposed within the upper portion of the first chamber, a first baffle concentrically disposed within the second chamber, and a second baffle disposed within the lower portion of the first chamber. A water inlet is attached to or formed integrally with the second chamber; a water outlet is attached to or formed integrally with the first chamber; and an optional bypass outlet is attached to or formed integrally with the first chamber.

34 Claims, 9 Drawing Sheets

OTHER PUBLICATIONS

CDS Technologies, Fine Solids Separator, 2 pgs.
Complete Line of Structural Storm Water BMPs, Stormwater ad p. 45, Nov./Dec. 2003.
Continuous Deflective Separation (CDS) © CDS Technologies Inc. 2004, www.cdstech.com/cdstech/us/home.asp, Mar. 7, 2005, 1 pg.
EcoTechnic ecostorm stormwater treatment, www.ecotechnic@ecoStorm/title.htm, Mar. 7, 2005, 1 pg.
Environment 21 LLC VBI 2 Stormwater Treatment Technical Report Mar. 25, 2003, 1 pg.
Environment 21 sketch plan, Online System/Adapt to Site Layout, Dwg. No. Std Detail-1, dated Jan. 21, 2003, 2 pgs.
ENV21 Site Data/Sketch Plan Online System, V2B1 Manufacturer—Approved V2B1 Manufacturer, 3 pgs.
Environment 21 Unistorm ™ pp. 1-2 env21/v2b1material/2003 website literature Jun. 13, 2003.
Faram, et al. A method for the numerical assessment of sediment interceptors, Technical Notes TN 169 (Feb. 2002), pp. 1-10.
Gao, et al., The study on Ephedrine production by membranous separation process, Membrane Science and Technology, (Feb. 1998): vol. 18, No. 1, 3 pgs. http://www.ent.ohiou.edu/~yumingsu/academics/Publication-1.html, May 11, 2006.
Hunt, C. L. et al., Mitigating Highway Runoff Constituents via a Wetland, Transportation Research Record TRB, Aug. 1, 2001, pp. 1-20.
Hydro International StormWater Management, 2003, 12 pgs.
Hydro International, Corporate, 11 pgs.
Hydro International, Downstream Defender, www.hydrointernational.biz/nam/storm.prod3.html, Mar. 7, 2005, 3 pgs.
Mitchell, et al., Using a pipe as a storm water treatment device, 2002, American Surface Water Quality Conference and Exposition Storm Con. Marco Island, Florida, 11 pgs.
Mitchell, et al., Using a wetland to mitigate highway storm water runoff, ASCE publication-Bridging the Gap: Meeting the World's Water and Resources Challenges, 2001, 470-475, 10 pgs.
Overview of the Stormwater Program, U.S. Environmental Protection Agency, Office of Water (42030, EPA 833-R-96-008 Jun. 1996, 42 pgs.
Phipps, et al., Evaluation of Different Configuration of Stormwater Treatment Chamber StormCon: 3rd North American Surface Water Quality Conference and Exposition, Jul. 26-29, 2004, 6 pgs.
U.S. Environment Protection Agency, Preliminary Studies, Preliminary Data Sumary of Urban Stormwater Best Management Practices, EPA-821-R-99-102 Aug. 1999.
Schwartz, et al. Continuous Deflection Separation of Stormwater Particulates, American Filtration and Separation Society, vol. 12, pp. 219-226.
Specifying a Vortechs System, www.vortechnics.com, 1 pg.
Stormwater Phase II Final Rule, EPA 833-F-00-001 Jan. 2000, U.S. EPA, Office of Water, 4 pgs.
Ecostorm, Stormwater Treatment System, The clear choice for clear water, Royal Environmental Systems, Inc. p. 21 Jan./Feb. 2004.
Su, et al., Characteristics of First flush Effects in Storm Water Runoff via a Detention-Retention System, TRB Symposium on Storm Water Management for Highways, Transportation Research Board, Bonita Springs, FL. (2005).
Su, et al., Characteristics of First flush Effects in Storm Water Runoff via a Detention-Retention System, Nov. 15, 2005, 12 pgs.
Su, et al., Conceptual Storm Water Runoff Treatment Cost-Benefit Analysis, 12 pgs. 2006 American Surface Water Quality Conference and Exposition, StormCon, Denver, CO, www.ent.ohiou.edu.
Su, et al., Using First Order Modeling To Describe First Flush Effects of Storm Water Runoff, 2003 American Surface Water Quality Conference and Exposition StormCon, San Antonio, TX. (2003), 7 pgs.
Su, et al., Performance Evaluation of a New Storm Water Treatment Device, 2005 American Surface Water Quality Conference and Exposition, StormCon, Orlando, FL. (2005), 6 pgs.
Su, et al., Storm water treatment with multi-chamber pipes. Athens, Ohio: Ohio University Thesis, (Nov. 2002).
Su, et al., Treatment of Runoff From Bridges, 2004 American Surface Water Quality Confernece and Exposition StormCon, Palm Deserts, CA. (2004), 9 pgs.
Technical Bulletin 1, Vortechnics Inc. VortSentry Performance: Full Scale Laboratory Test Results ©2004, 3pgs.
Vortechnics, Vort Sentry www.vortechnics.com/products/vortsentry printed Mar. 7, 2005, 3 pgs.
Vortechs System Get proven, reliable stormwater treatment evertime © Vortechnics Inc. 2004, 1 pg.
Vortechs System Operation © Vortechnics Inc. 2004, 1 pg.
Vortechs System: a System Sized for Every Application, www.vortechnics.com, 1 pg.
VortSentry, The VortSentry effectively captures pollutants from stormwater runoff, ©Vortechnics Inc. 2004, 1 pg.
VortSentry Model VS80 Technical Design Manual, 9 pgs.
VortSentry Technical Specification Stormwater Treatment System, 4 pgs.

* cited by examiner

STORM WATER RUNOFF TREATMENT SYSTEM

BACKGROUND OF THE INVENTION

This invention relates in general to water treatment devices, and in particular to a hydrodynamic separator for removing pollutants from storm water runoff.

Storm water runoff from the roofs of buildings, bridges, highways, parking lots, and other urban areas often contains pollutants such as heavy metals, oil, grease, and a variety of suspended solids including sediment, sand, gravel, and the like. When such pollutants enter a receiving body of water such as a river, stream, lake, or pond, numerous adverse environmental effects are likely. Thus, it is desirable to remove as many of these pollutants as possible before the pollutants enter a receiving body of water.

While various systems for treating runoff are known, these devices are often inappropriately sized, complex, expensive, difficult to configure and, maintain, experience high water head loss, require power, and/or may not adequately remove both solid and floatable pollutants prior to discharging into a receiving body of water. Thus, there is a need for a space saving, efficient, easy to manufacture storm water treatment device that may be easily installed and maintained, and that requires little or no electrical power for its operation.

SUMMARY OF THE INVENTION

Deficiencies in and of the prior art are overcome by the present invention, the exemplary embodiment of which provides a system for reducing the concentration of various pollutants found in storm water runoff. The system utilizes a hydrodynamic separator having at least two concentric cylinders.

In accordance with one aspect of the present invention, a storm water runoff treatment system is provided. An exemplary embodiment of this system includes: (a) a source of storm water runoff such as, but not limited to, a roof, bridge, highway, street, parking lot and/or paved surface; (b) a hydrodynamic device for removing sediment, oil, grease, and other materials from the storm water runoff; and (c) a discharge environment such as, but not limited to, a river, stream, lake, or pond for receiving the treated storm water runoff.

In accordance with another aspect of the present invention, a hydrodynamic device or unit for removing sediment, oil, grease, and other materials from the storm water runoff is provided. An exemplary embodiment of this device includes: (a) a first substantially cylindrical chamber that further comprises an upper portion and a lower portion; (b) a second substantially cylindrical chamber concentrically disposed within the upper portion of the first chamber, wherein the first chamber and the second chamber form a first annular space or region therebetween; (c) a first baffle disposed within the second chamber, wherein the second chamber and the first baffle form a second annular space or region therebetween, and wherein the first baffle defines an opening or passage through its length; (d) a second baffle disposed within the lower portion of the first chamber, wherein the second baffle further comprises a ring-shaped member and a plurality of vertical or angled plates attached to the ring-shaped member; (e) an inlet attached to or formed integrally with the second chamber; (f) an outlet attached to or formed integrally with the first chamber; and (g) an optional bypass outlet attached to or formed integrally with the first chamber.

Additional features and aspects of the present invention will become apparent to those of ordinary skill in the art upon reading and understanding the following detailed description of the exemplary embodiments. As will be appreciated, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description of the embodiments given below, serve to explain the principles of the invention.

DETAILED DESCRIPTION OF THE INVENTION

This invention relates to systems and devices for use with storm water runoff. A first general embodiment of this invention provides a treatment system for storm water runoff. An exemplary embodiment of system includes: (a) a source of storm water runoff such as, but not limited to, a roof, bridge, highway, street, parking lot and/or paved surface; (b) a hydrodynamic device for removing sediment and other materials from the storm water runoff; and (c) a discharge environment such as, but not limited to, a river, stream, lake, or pond for receiving the treated storm water runoff. A second general embodiment of this invention provides a hydrodynamic device or unit for removing sediment, oil, grease, and other materials from the storm water runoff. An exemplary embodiment of this device includes: (a) a first substantially cylindrical chamber that further comprises an upper portion and a lower portion; (b) a second substantially cylindrical chamber disposed within the upper portion of the first chamber, wherein the first chamber and the second chamber form a first annular space or flow region therebetween; (c) a first baffle disposed within the second chamber, wherein the second chamber and the first baffle form a second annular space or flow region therebetween, and wherein the first baffle defines an opening or passage through its length; (d) a second baffle disposed within the lower portion of the first chamber, wherein the second baffle further comprises a ring-shaped member and/or a plurality of substantially vertical or angled plates attached to the ring-shaped member; (e) an inlet attached to or formed integrally with the second chamber; (f) an outlet attached to or formed integrally with the first chamber; and (g) an optional bypass outlet attached to or formed integrally with the first chamber. The term "baffle" as it generally relates to the present invention is defined as "a device or structure that deflects, checks, regulates, or reduces the flow of a liquid such as water." The baffles of this invention may also aid in or enhance the removal of pollutants carried in the water.

Figure 1:
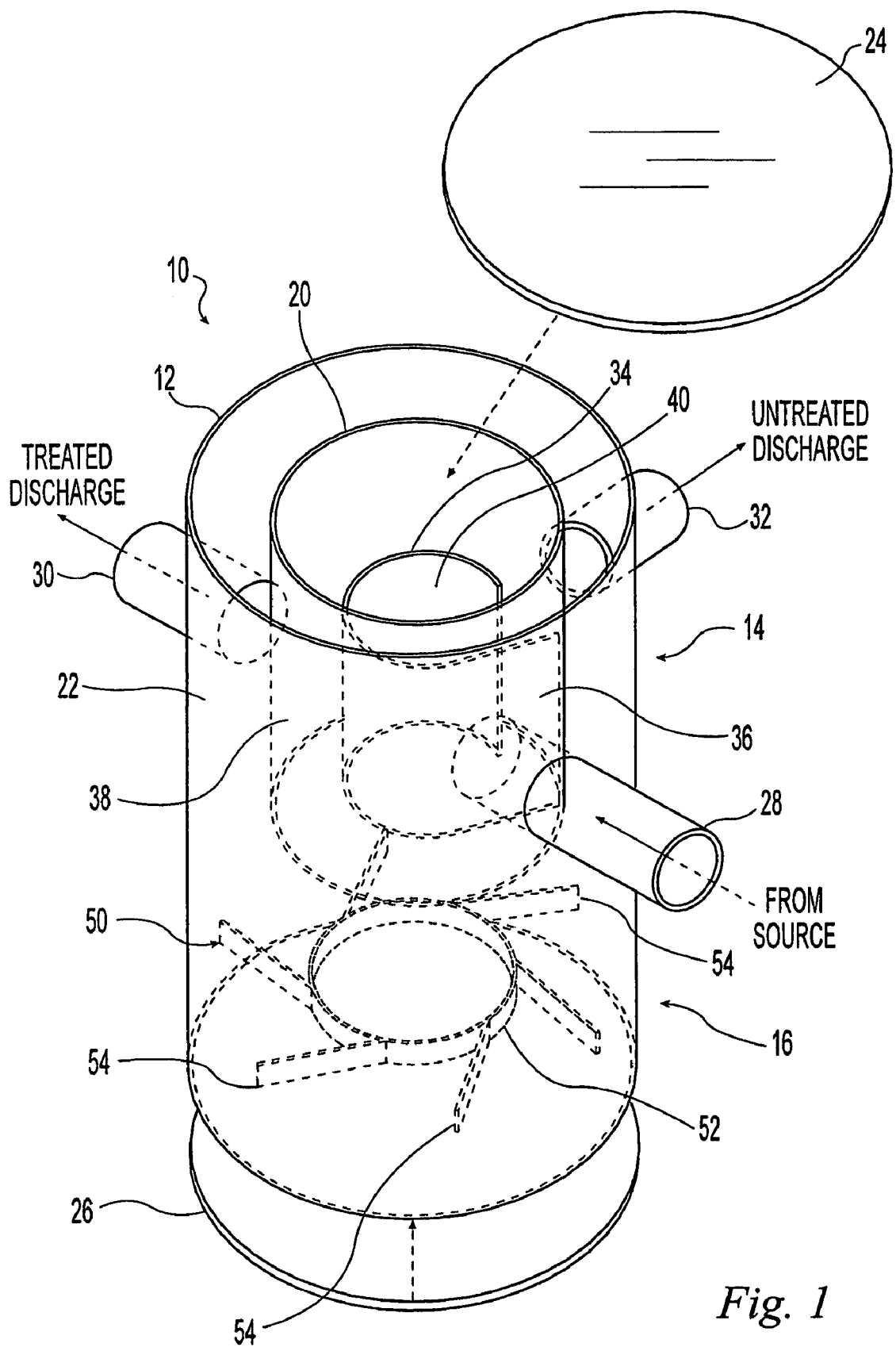
FIG. 1 is a semi-transparent perspective view of the exemplary embodiment of the hydrodynamic storm water runoff treatment device of the present invention showing the external and internal structure of the device.
Figure 2:
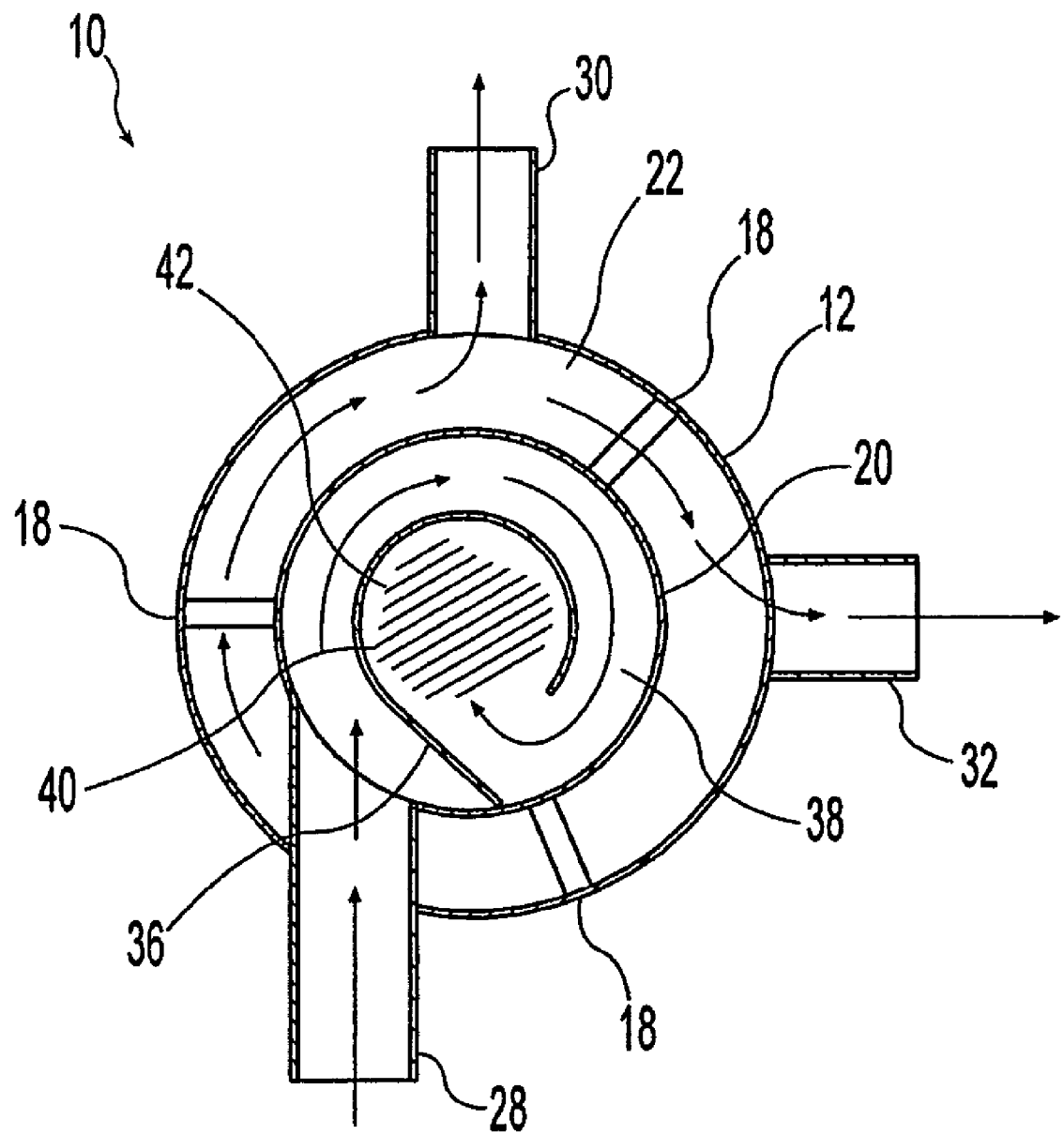
FIG. 2 is a top view of the exemplary embodiment of the hydrodynamic storm water runoff treatment device of the present invention showing the directional flow of water into and through the device.
Figure 3:
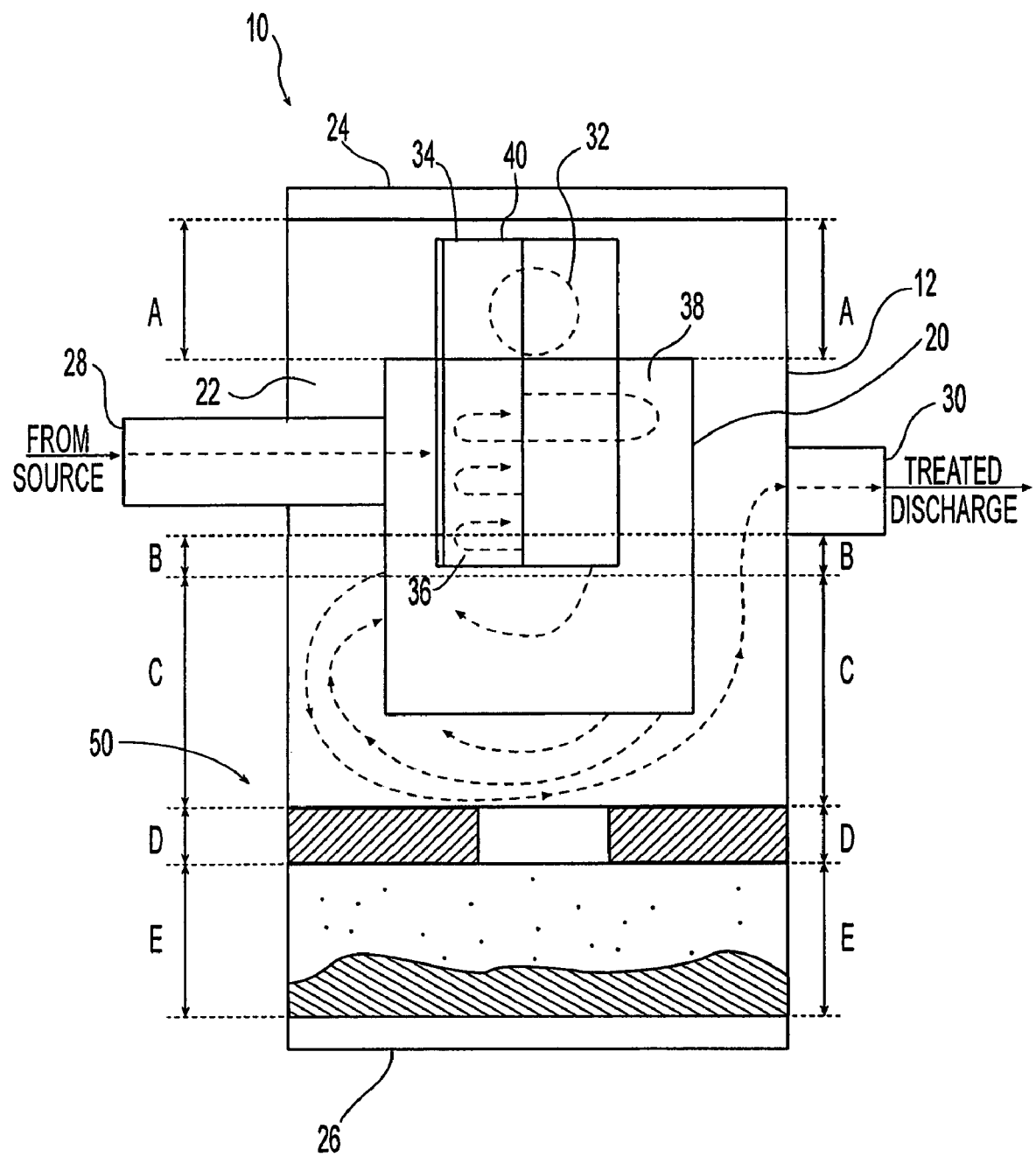
FIG. 3 is a semi-transparent side view of the exemplary embodiment of the hydrodynamic storm water runoff treatment device of the present invention showing the internal structure of the device and the directional flow of water into and through the device.
Figure 4A:
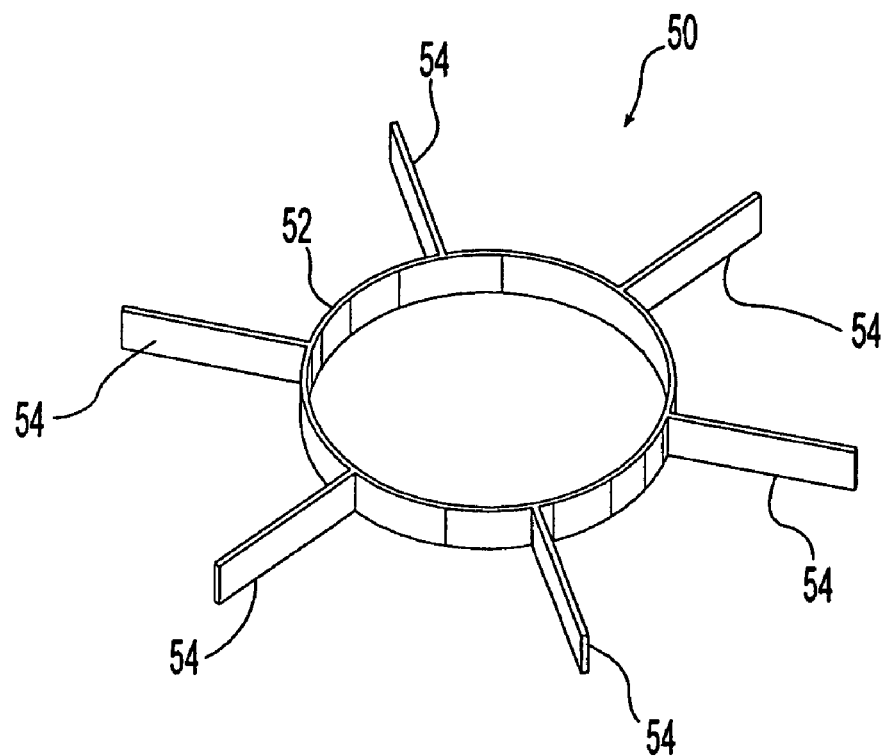
FIGS. 4A–B are perspective and top views of a first embodiment of the second baffle of the present invention.
Figure 4B:
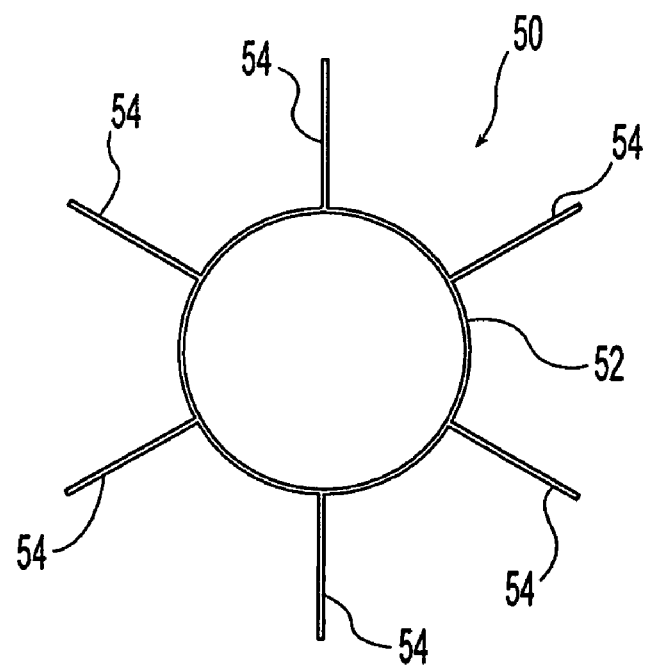
Figure 5A:
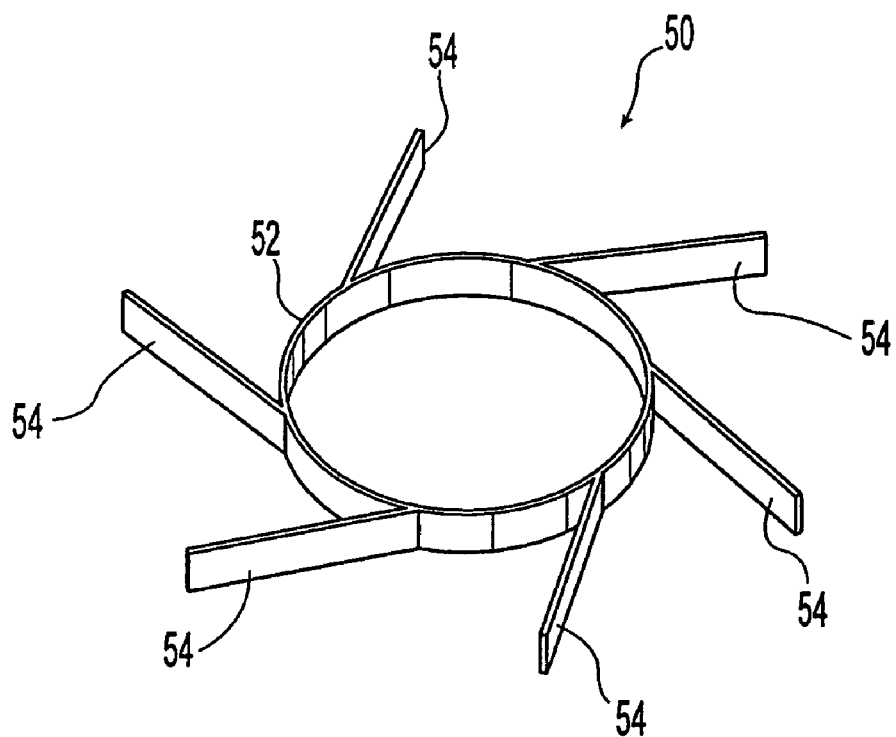
FIGS. 5A–B are perspective and top views of a second embodiment of the second baffle of the present invention.
Figure 5B:
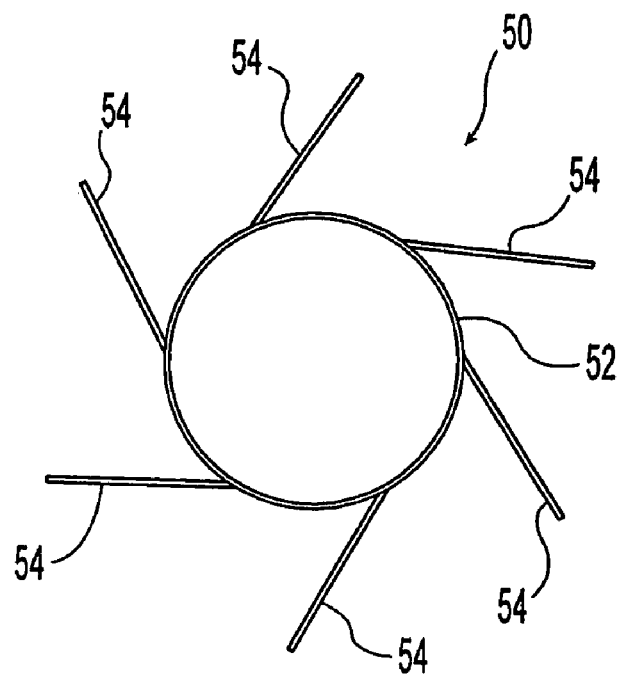

With reference now to the Figures, the exemplary embodiment of hydrodynamic treatment device 10 shown in FIGS. 1–3 includes a substantially cylindrical first or outer chamber 12 that further includes an upper portion 14 and a lower portion 16. A plurality of posts 18 or another attachment member or members may be used to attach outer chamber 12 to a substantially cylindrical second or inner chamber 20, which is disposed within outer chamber 12. As best shown in FIG. 2, because the outer diameter of inner chamber 20 is significantly less than the inner diameter of outer chamber 12, a first space or annular region 22 is formed between the walls of two chambers. In some embodiments, a material for capturing and retaining metals is placed in annular region 22. Inlet 28 passes through the wall of outer chamber 12 and is attached to or formed integrally with the outer wall of inner chamber 20. Similarly, outlet 30 is attached to or formed integrally with the outer wall of outer chamber 12. In some embodiments, a secondary bypass outlet 32 is also attached to or formed integrally with the outer wall of outer chamber 12 and is typically located above outlet 30.

Again with reference to FIGS. 1–3, in the exemplary embodiment, a first baffle 34 is disposed within inner chamber 20 and is typically attached to or formed integrally with the inner wall of inner chamber 20. Baffle 34 is located near inlet 28 and typically includes a planar surface 36. As best shown in FIG. 2, because the outer diameter of baffle 34 is significantly less than the inner diameter of inner chamber 20, a second space or annular region 38 is formed between the walls of the baffle and the inner chamber. In this embodiment, baffle 34 is semi-cylindrical in shape and defines a passage 40 through its length. At least one floatable, oil absorbing material 42 or other absorbent/adsorbent material may be disposed within passage 40.

Figure 6A:
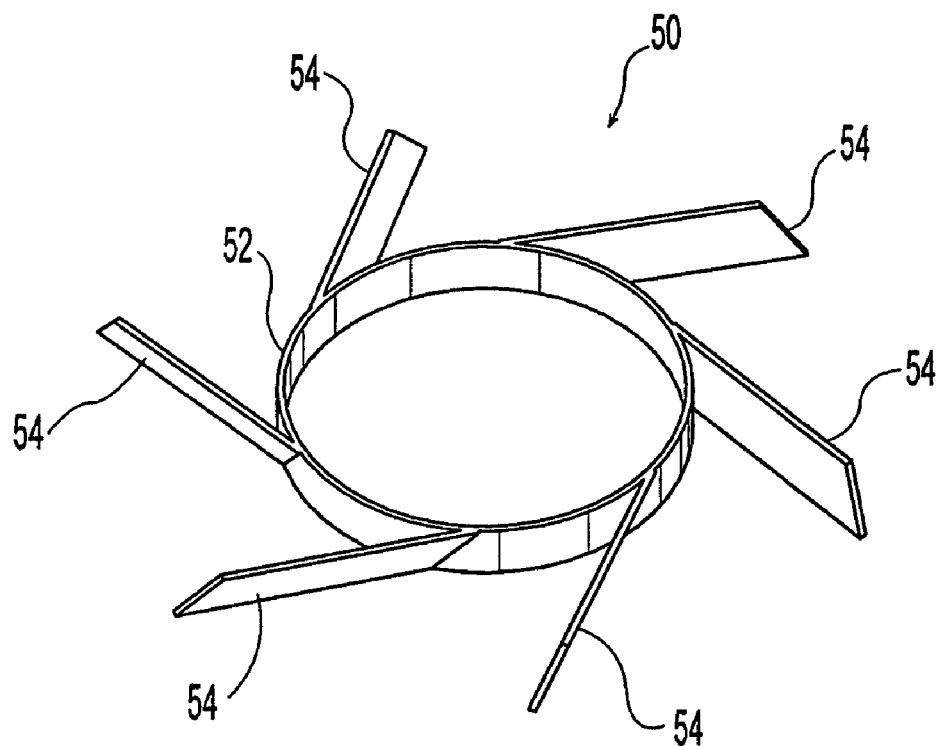
FIGS. 6A–B are perspective and top views of a third embodiment of the second baffle of the present invention.
Figure 6B:
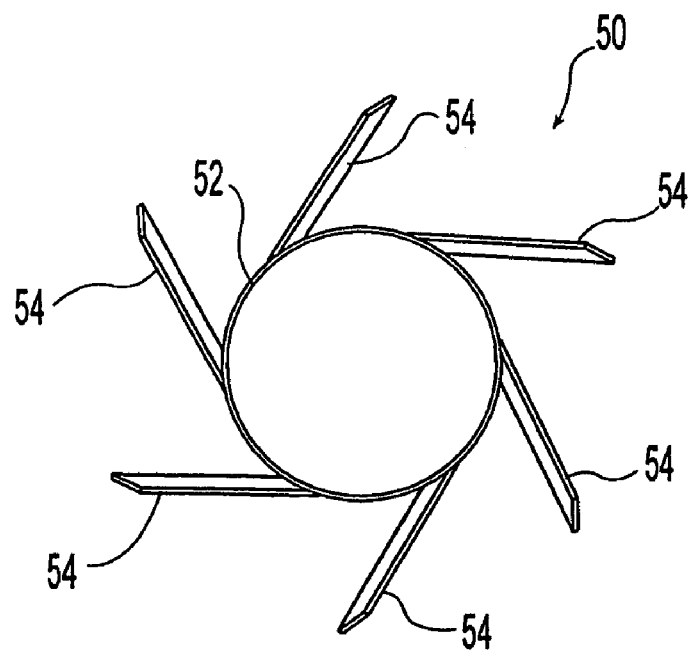
Figure 7:
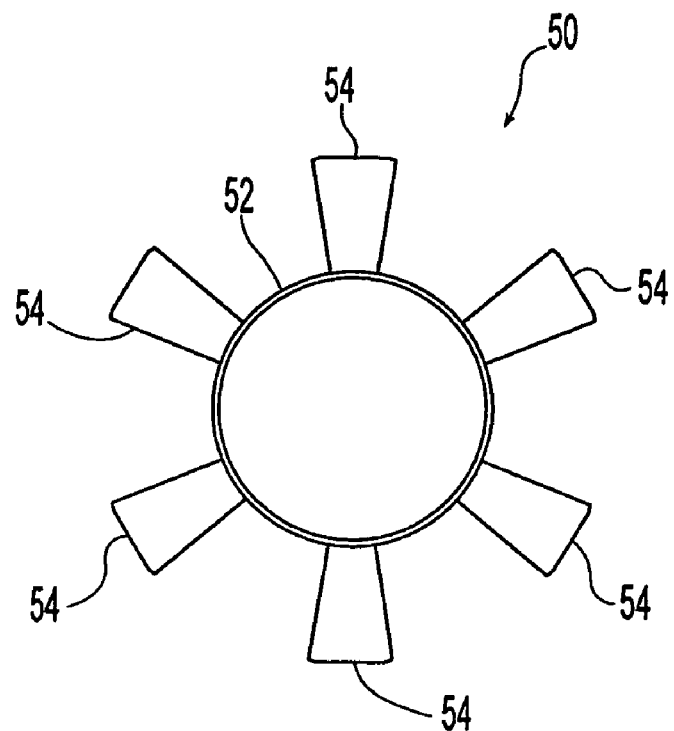
FIG. 7 is a top view of a fourth embodiment of the second baffle of the present invention.
Figure 8:
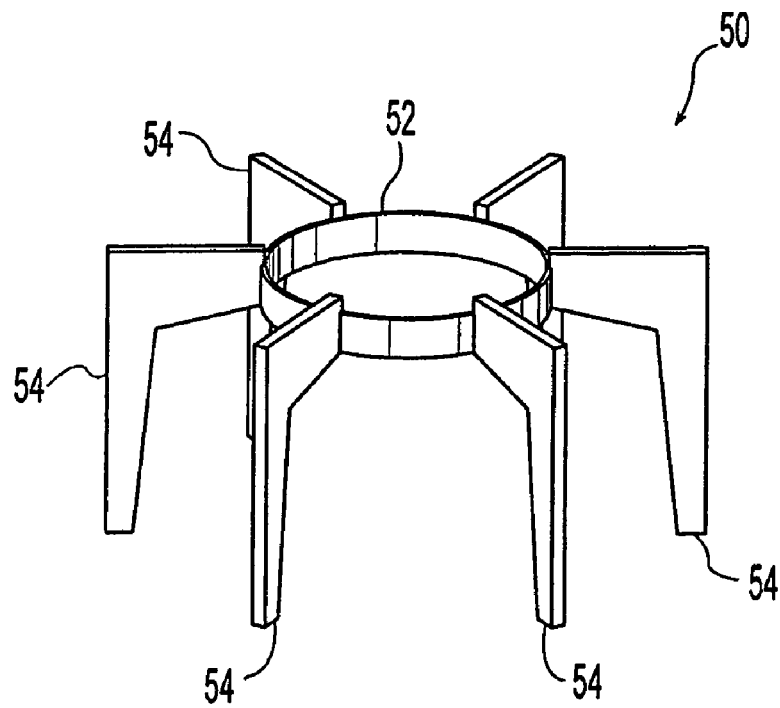
FIG. 8 is a perspective view of a fifth embodiment of the second baffle of the present invention, wherein the plates support the second baffle above the bottom of the outer chamber.
Figure 9A:
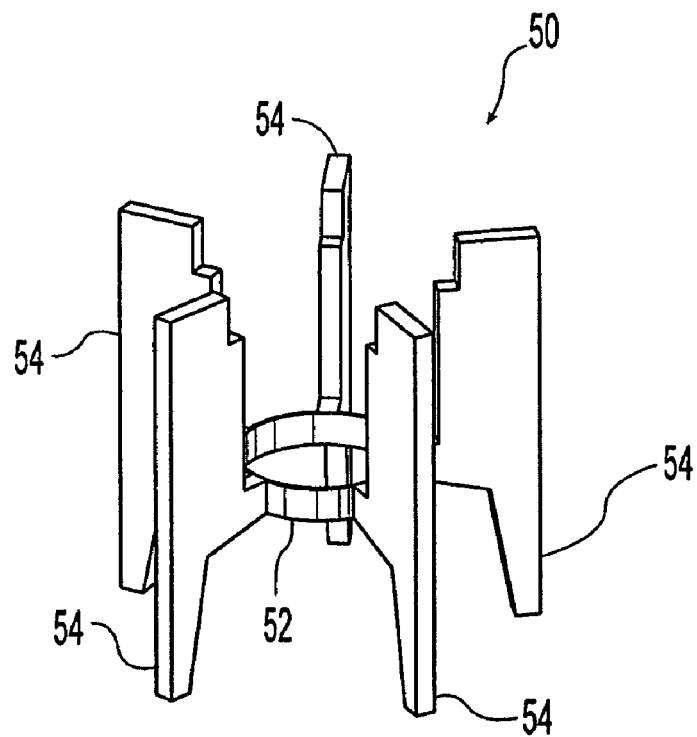
FIGS. 9A–B are perspective and side views of a sixth embodiment of the second baffle of the present invention, wherein the plates support the second baffle and inner chamber above the bottom of the outer chamber.
Figure 9B:
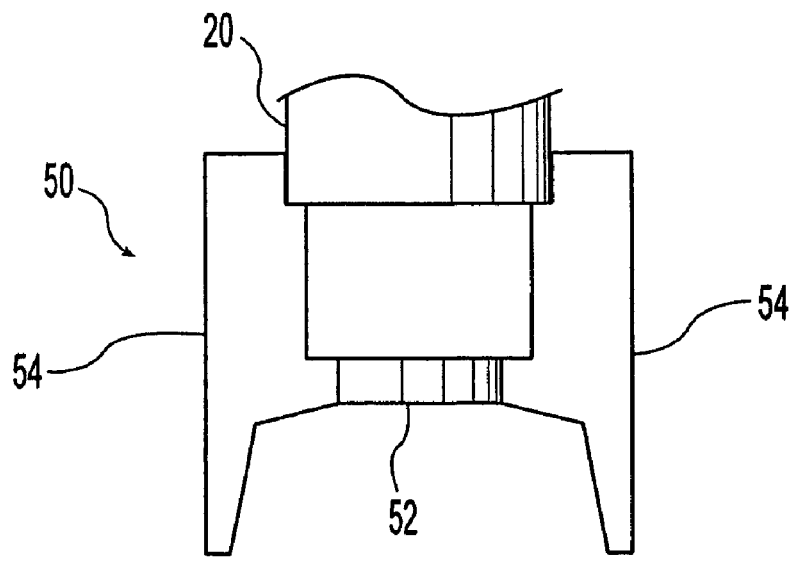
Figure 10A:
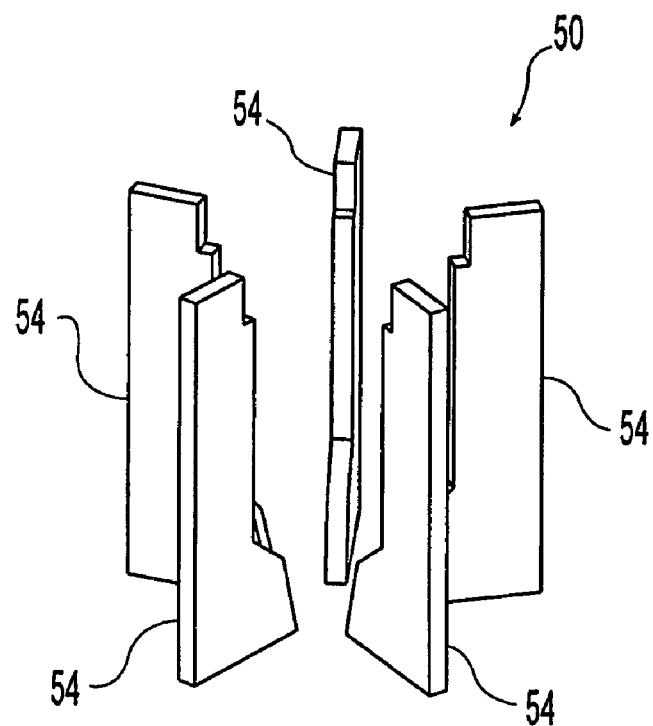
FIGS. 10A–B are perspective and side views of a seventh embodiment of the second baffle of the present invention, wherein the ring structure is absent and the plates support the second baffle and the inner chamber above the bottom of the outer chamber.
Figure 10B:
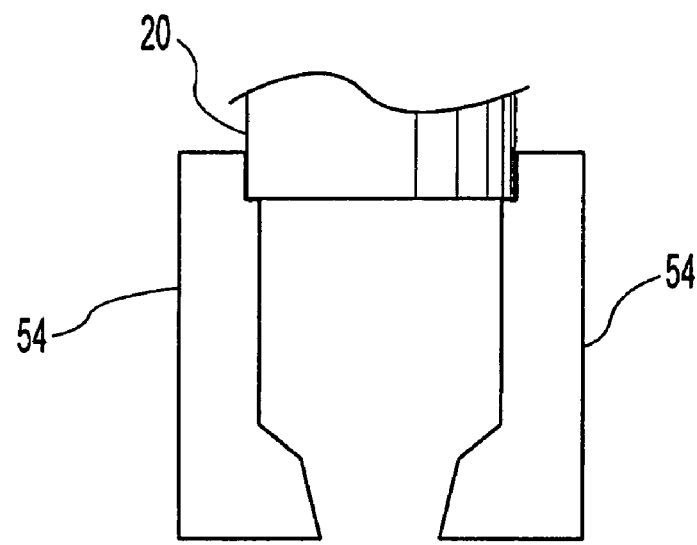

As shown in FIGS. 1 and 3, in the exemplary embodiment, a second baffle 50 is disposed within the lower portion 16 of outer chamber 12 and is partially or completely suspended above the bottom of outer chamber 12. Baffle 50 typically includes a ring-shaped support structure 52 that further includes a plurality of plates 54 that are attached to and extend away from the perimeter of ring 52. Alternate configurations of baffle 50 are possible, and FIGS. 4A–B, 5A–B, 6, 7, 8A–B, 9A–B, and 10A–B provide various views of alternate embodiments of baffle 50. In some embodiments (see FIGS. 4A–B, 5A–B, and 6A–B), the plates 54 are connected with, attached to, or formed integrally with the inner wall of outer chamber 12. In other embodiments (see FIGS. 8, 9A–B, and 10A–B), baffle 50 is a freestanding structure that sits on the bottom of outer chamber 12 using plates 54 to support the baffle. In still other embodiments (see FIGS. 9A–B and 10A–B), plates 54 are designed to support inner chamber 20. In the embodiment of baffle 50 shown in FIGS. 100A–B, ring 52 is absent and plates 54 support inner chamber 20. In embodiments that include a plurality of plates 54 attached to or formed integrally with ring 52, plates 54 may be vertical or the plates may be angled upward as shown in FIGS. 6A–B. In embodiments such as those shown in FIGS. 5A–B and 6A–B, the horizontal orientation of the plates 54 relative to ring 52 typically corresponds to the directional flow of the water in outer chamber 12.

In the exemplary embodiment, the bottom portion of outer chamber 12 is either permanently or semi-permanently closed. An upper lid 24 is used to close the top portion of chamber 12 and a lower lid 26 is used to close the bottom portion of chamber 12 when treatment device 10 is in use. These lids may be completely removable or may be hinged for allowing access to the interior of treatment device 10 for cleaning or repairs. Other types of closure devices are possible for use with the present invention. In some embodiments, lower lid 26 is absent and the bottom portion of chamber 12 is either completely sealed or is accessible by way of an access pipe or aperture (not shown).

The treatment device of the present invention removes pollutants from storm water runoff and retains these pollutants for removal at a later date. With reference to the exemplary embodiment shown in FIGS. 2–3, untreated water enters device 10 through inlet 28 and flows into inner chamber 20. Inlet 28 is typically offset from the central vertical axis of outer chamber 12. The offset inlet and the curved inner surface of inner chamber 20 encourages water entering the device to flow in a clockwise, or alternately a counter-clockwise, rotational, downward pattern. This flow encourages solids separation and draws the settleable solids down to the bottom of the device while simultaneously directing oil and floatables to the upper portion of the unit. After entering inner chamber 20, untreated water enters first baffle 34 where it contacts the absorbent/adsorbent material 42 contained within passage 40. The bottom edge of first baffle 34 is typically below the standing (i.e., passive) water level within the device. Pollutants such as oil are removed from the water and held in the oil retention zone (see zone "B" in FIG. 3). The placement of first baffle 34 within inner chamber 20 reduces the turbulence of the water flowing into inner chamber 20, and directs oil and floatables to the center of passage 40, thereby enhancing the effectiveness of absorbent/adsorbent material 42.

The hydrodynamic motion (see zone "C" in FIG. 3) of the water passing through treatment device 10 causes the water to flow through the length of inner chamber 20, out of inner chamber 20, and into the lower portion of outer chamber 12 where it enters the static zone (see zone "D" in FIG. 3). The placement of second baffle 50 within the lower portion of outer chamber 12 significantly reduces the velocity and spiraling motion of the water entering the lower portion of outer chamber 12, thereby permitting sediment, sand, gravel, dirt, and other relatively heavy suspended solids to settle out of the storm water runoff and come to rest in the sediment storage zone (see zone "E" in FIG. 3). The construction of second baffle 50 reduces the tendency of solids to settle only in the center of the bottom of outer chamber 12, and reduces the likelihood that captured solids will be "scoured" by water flowing through and out of device 10. In this manner, solids deposited in the bottom of outer chamber 12 are retained beneath second baffle 50 until the sediment is removed during periodic cleaning of the unit. Treated water flows upward through first annular region 22 and exits treatment device 10 through outlet 30. In some embodiments, at least one absorbent/adsorbent material for capturing and retaining metals is disposed within annular region 22 and further reduces pollutant concentrations prior to the treated water exiting treatment device 10.

Despite the inclusion of first and second baffle plates 34 and 50, high intensity flow events may be problematic for the system. To prevent scouring of the retained sediment and protect the oil retention zone, bypassing of a portion of flow may be necessary under high flow conditions. If the flow of storm water runoff into treatment device 10 exceeds the capacity of the device, this excess water enters the bypass zone (see zone "A" in FIG. 3) and exits device 10 through bypass outlet 32.

Having generally described this invention, a further understanding can be obtained by reference to a specific example, which is provided for purposes of illustration only and is not intended to be all-inclusive or limiting unless otherwise specified. A small-scale version of hydrodynamic storm water treatment device 10 includes an outer chamber 12 that is about 24 inches in height and about 12 inches in diameter, and an inner chamber 20 that is about 18 inches in height and about 8 inches in diameter. Inlet 28, outlet 30, and bypass outlet 32 are all about 3 inches in diameter and inlet 28 and outlet 30 are placed about 8 inches below the top edge of outer chamber 12. The central horizontal axis of bypass outlet 32 is about 2.5 inches above the central horizontal axis of inlet 28 and outlet 30. The central axis of inlet 28 is offset about 3 inches from the central axis of outer chamber 12. First baffle 34 is a cut 270–300° cylinder attached to a plate, which is in turn attached to the inner wall of inner chamber 20. The dimensions of larger versions of hydrodynamic storm water treatment device 10 will typically be proportional to the dimensions of smaller versions, although variations are possible.

The system and device of the present invention provides numerous advantages over existing systems and devices. For example, the compact design and vertical orientation of the hydrodynamic device makes the device useful for applications where horizontal space is limited. Additionally, the vertical configuration is immediately compatible with the scupper drains already installed on many bridges and/or can be retrofit to treat drainage from bridges, whether or not a scupper drain is present. The position of inlet 28 may be changed to create clockwise or counterclockwise flow as needed. The positions of both outlets 30 and 32 may be changed to accommodate existing drainage systems into which treatment device 10 is integrated. The removable upper lid 24, which provides one-point access to the interior of the device, facilitates periodic cleaning (e.g., removal of sediment) and maintenance (e.g., removal and replacement of absorbent/adsorbent materials). For sediment removal, a closeable drainage pipe may also be included in the bottom of the unit. In embodiments where the device is only accessible from the top (e.g., where the unit is buried), only a single manhole is used to access the device. Furthermore, hydrodynamic device 10 typically requires no electrical power for operation, includes an integrated bypass capability, reduces water head loss, and may be connected in parallel or in series to other treatment devices, including additional hydrodynamic storm water runoff treatment devices.

The hydrodynamic storm water runoff treatment device of the present invention may be manufactured from a variety of materials using known manufacturing methods. Some or all of the components of the device may be manufactured from one or more thermoplastic materials (e.g., HDPE, PVC), which are desirable in some instances (e.g., bridge applications) due to their durability and relatively light weight. For other applications, steel, aluminum, or even concrete may be used for some or all of the device components. Various combinations of these and other materials are also possible for this invention. For example, concrete may be used for the outer chamber, while one or more thermoplastic materials are used for the inner chamber and the other internal components.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed is:

1. A system for treating storm water runoff, comprising:
   (a) a source of storm water runoff;
   (b) at least one device for treating the storm water runoff in communication with the storm water runoff, wherein the at least one device further comprises:
      (i) a first chamber, wherein the first chamber further comprises an upper portion and a lower portion;
      (ii) a second chamber disposed within the upper portion of the first chamber, wherein the first chamber and the second chamber form a first flow region therebetween;
      (iii) a first baffle disposed within the second chamber, wherein the second chamber and the first baffle form a second flow region therebetween, and wherein the first baffle defines a passage through its length;
      (iv) a second baffle disposed within the lower portion of the first chamber;
      (v) an inlet attached to or formed integrally with the second chamber; and
      (vi) an outlet attached to or formed integrally with the first chamber; and
   (c) a discharge environment for receiving treated storm water runoff.

2. The system of claim 1, further comprising multiple devices for treating the storm water runoff, wherein the devices are connected to one another in series or in parallel.

3. The system of claim 1, further comprising a bypass outlet attached to or formed integrally with the first chamber.

4. The system of claim 1, further comprising at least one attachment member for attaching the first chamber to the second chamber.

5. The system of claim 1, further comprising at least one absorbent or adsorbent material disposed within at least one of the first flow region and the passage in the first baffle.

6. The system of claim 1, wherein the source of storm water runoff further comprises a roof, bridge, highway, street, parking lot, paved surface, or combinations thereof.

7. The system of claim 1, wherein the first chamber and the second chamber are substantially cylindrical in shape.

8. The system of claim 1, wherein the first chamber further comprises at least one of a top lid for closing the upper portion of the first chamber and a bottom lid for closing the lower portion of the first chamber.

9. The system of claim 1, wherein the first baffle is partially cylindrical in shape.

10. The system of claim 1, wherein a portion of the first baffle is attached to or formed integrally with the second chamber.

11. The system of claim 1, wherein the second baffle further comprises a substantially ring-shaped member.

12. The system of claim 1, wherein the second baffle further comprises a plurality of substantially vertical plates.

13. The system of claim 1, wherein the second baffle further comprises a ring-shaped member and a plurality of substantially vertical plates attached to the ring-shaped member.

14. The system of claim 1, wherein at least a portion of the second baffle is suspended above the bottom of the first chamber.

15. The system of claim 1, wherein the discharge environment is a river, stream, lake, pond, or combinations thereof.

16. A hydrodynamic device for treating storm water runoff, comprising:
    (a) a first chamber, wherein the first chamber further comprises an upper portion and a lower portion;
    (b) a second chamber disposed within the upper portion of the first chamber, wherein the first chamber and the second chamber form a first annular region therebetween;
    (c) a first baffle disposed within the second chamber, wherein the second chamber and the first baffle form a second annular region therebetween, and wherein the first baffle defines a passage through its length;
    (d) a second baffle disposed within the lower portion of the first chamber;
    (e) an inlet attached to or formed integrally with the second chamber; and
    (f) an outlet attached to or formed integrally with the first chamber.

17. The device of claim 16, further comprising a bypass outlet attached to or formed integrally with the first chamber.

18. The device of claim 16, further comprising at least one attachment member for attaching the first chamber to the second chamber.

19. The device of claim 16, further comprising at least one absorbent or adsorbent material disposed within at least one of the first annular region and the passage in the first baffle.

20. The device of claim 16, wherein the first chamber and the second chamber are substantially cylindrical in shape.

21. The device of claim 16, wherein the first chamber further comprises at least one of a top lid for closing the upper portion of the first chamber and a bottom lid for closing the lower portion of the first chamber.

22. The device of claim 16, wherein the first baffle is partially cylindrical in shape.

23. The device of claim 16, wherein a portion of the first baffle is attached to or formed integrally with the second chamber.

24. The device of claim 16, wherein the second baffle further comprises a substantially ring-shaped member.

25. The device of claim 16, wherein the second baffle further comprises a plurality of substantially vertical plates.

26. The device of claim 16, wherein the second baffle further comprises a ring-shaped member and a plurality of plates attached to the ring-shaped member.

27. The device of claim 16, wherein the second baffle is suspended above the bottom of the first chamber.

28. A hydrodynamic device for treating storm water runoff, comprising:
    (a) a first substantially cylindrical chamber, wherein the first chamber further comprises an upper portion and a lower portion;
    (b) a second substantially cylindrical chamber disposed within the upper portion of the first chamber, wherein the first chamber and the second chamber form a first annular region therebetween;
    (c) a first baffle disposed within the second chamber, wherein the second chamber and the first baffle form a second annular region therebetween, and wherein the first baffle defines a passage through its length;
    (d) a second baffle disposed within the lower portion of the first chamber, wherein the second baffle further comprises a ring-shaped member and a plurality of plates attached to the ring-shaped member;
    (e) an inlet attached to or formed integrally with the second chamber;
    (f) an outlet attached to or formed integrally with the first chamber; and
    (g) a bypass outlet attached to or formed integrally with the first chamber.

29. The device of claim 28, further comprising at least one attachment member for attaching the first chamber to the second chamber.

30. The device of claim 28, further comprising at least one absorbent or adsorbent material disposed within at least one of the first annular region and the passage in the first baffle.

31. The device of claim 28, wherein the first chamber further comprises at least one of a top lid for closing the upper portion of the first chamber and a bottom lid for closing the lower portion of the first chamber.

32. The device of claim 28, wherein the first baffle is partially cylindrical in shape.

33. The device of claim 28, wherein a portion of the first baffle is connected to or formed integrally with the second chamber.

34. The device of claim 28, wherein a portion of the second baffle is suspended above the bottom of the first chamber.

* * * * *